US012586023B2

(12) United States Patent
Moynet

(10) Patent No.: US 12,586,023 B2
(45) Date of Patent: Mar. 24, 2026

(54) DYNAMIC BALANCING OF WELL CONSTRUCTION AND WELL OPERATIONS PLANNING AND RIG EQUIPMENT TOTAL COST OF OWNERSHIP

(71) Applicant: SCHLUMBERGER TECHNOLOGY CORPORATION, Sugar Land, TX (US)

(72) Inventor: Stephane Moynet, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 388 days.

(21) Appl. No.: 16/753,823

(22) PCT Filed: Oct. 8, 2018

(86) PCT No.: PCT/US2018/054796
§ 371 (c)(1),
(2) Date: Apr. 6, 2020

(87) PCT Pub. No.: WO2019/071248
PCT Pub. Date: Apr. 11, 2019

(65) Prior Publication Data
US 2020/0293971 A1 Sep. 17, 2020

Related U.S. Application Data

(60) Provisional application No. 62/568,842, filed on Oct. 6, 2017.

(51) Int. Cl.
*G06Q 10/0637* (2023.01)
*E21B 44/00* (2006.01)
(Continued)

(52) U.S. Cl.
CPC ....... *G06Q 10/06375* (2013.01); *E21B 44/00* (2013.01); *E21B 47/00* (2013.01);
(Continued)

(58) Field of Classification Search
CPC ............. G06Q 10/06375; G06Q 10/04; G06Q 10/06313; G06Q 10/067; G06Q 10/20;
(Continued)

(56) References Cited

U.S. PATENT DOCUMENTS 6,178,393 B1 * 1/2001 Irvin ................... F04D 15/0066
700/282
6,877,360 B1 * 4/2005 Discenzo ............. G01N 29/022
73/54.01
(Continued)

FOREIGN PATENT DOCUMENTS

WO 2016108908 A1 7/2016
WO 2016182799 A1 11/2016
(Continued)

*Primary Examiner* — Rutao Wu
*Assistant Examiner* — Stephen S Swartz
(74) *Attorney, Agent, or Firm* — Jeffrey D. Frantz

(57) ABSTRACT

Computer program products, systems containing computer program products, and methods are disclosed for considering rig equipment asset life and maintenance costs in decisions related to well construction/operations planning. A method may include utilizing sensor measurements to generate and record condition indicators for equipment over time and using the condition indicators to develop/refine a digital avatar including a model correlating operation of the equipment with a progression of the condition indicators to predict changes in equipment condition. The method may further include calculating costs/profits based on a well construction/operation plan and predicting a progression of conditions of the equipment during operation of the plan. The digital avatar or comprehensive operations model may enable comparison of costs/profits from resource production
(Continued)

with a cost of service delivery (COSD) for the equipment, and may advantageously enable plan changes to be proposed to reduce/minimize costs and/or to increase/maximize profit.

18 Claims, 4 Drawing Sheets

(51) Int. Cl.

| | |
|---|---|
| *E21B 47/00* | (2012.01) |
| *G05B 13/04* | (2006.01) |
| *G06Q 10/04* | (2023.01) |
| *G06Q 10/0631* | (2023.01) |
| *G06Q 10/067* | (2023.01) |
| *G06Q 10/20* | (2023.01) |
| *G06Q 50/02* | (2012.01) |
| *E21B 3/02* | (2006.01) |

(52) U.S. Cl.
CPC ........... *G05B 13/048* (2013.01); *G06Q 10/04* (2013.01); *G06Q 10/06313* (2013.01); *G06Q 10/067* (2013.01); *G06Q 10/20* (2013.01); *G06Q 50/02* (2013.01); *E21B 3/022* (2020.05)

(58) Field of Classification Search
CPC ....... E21B 44/00; E21B 47/00; G06B 13/048; G05B 19/41885; G05B 23/027
USPC ........................................... 175/24; 705/7.36
See application file for complete search history.

(56) References Cited

U.S. PATENT DOCUMENTS

| | | | |
|---|---|---|---|
| 8,768,671 B2 | 7/2014 | Lee et al. | |
| 9,322,247 B2 | 4/2016 | Rojas et al. | |
| 9,388,680 B2 | 7/2016 | Moran | |
| 9,772,608 B2* | 9/2017 | Spacek | E21B 17/046 |
| 9,933,919 B2 | 4/2018 | Raja et al. | |
| 9,934,338 B2 | 4/2018 | Germain et al. | |
| 10,049,474 B2 | 8/2018 | Germain et al. | |
| 10,067,491 B2 | 9/2018 | Wingky et al. | |
| 10,161,226 B2 | 12/2018 | Bagnaro | |
| 10,209,400 B2 | 2/2019 | Bermudez Martinez et al. | |
| 10,260,332 B2 | 4/2019 | Srael et al. | |
| 10,273,752 B2 | 4/2019 | Mebane, III | |
| 10,294,770 B2 | 5/2019 | Anghelescu et al. | |
| 10,301,923 B2 | 5/2019 | Andresen et al. | |
| 10,392,918 B2 | 8/2019 | Harkless et al. | |
| 10,669,783 B2 | 6/2020 | Camacho Cardenas | |
| 10,689,953 B2 | 6/2020 | Camacho Cardenas et al. | |
| 10,705,517 B1* | 7/2020 | Dresang | H04W 4/38 |
| 10,920,565 B2* | 2/2021 | Hildebrand | E21B 44/06 |
| 2005/0143956 A1* | 6/2005 | Long | F04D 15/0088 |
| | | | 702/184 |
| 2005/0284661 A1 | 12/2005 | Goldman et al. | |
| 2011/0071963 A1* | 3/2011 | Piovesan | G06Q 10/00 |
| | | | 706/11 |
| 2011/0295460 A1* | 12/2011 | Hunt | G06Q 10/063114 |
| | | | 701/519 |
| 2012/0065944 A1* | 3/2012 | Nielsen | G06Q 50/06 |
| | | | 703/1 |
| 2013/0033090 A1* | 2/2013 | Jokonya | E21C 25/06 |
| | | | 299/30 |
| 2014/0116776 A1 | 5/2014 | Marx et al. | |
| 2014/0303949 A1* | 10/2014 | Boneti | G06F 3/0484 |
| | | | 715/771 |
| 2015/0330204 A1* | 11/2015 | Hildebrand | E21B 44/06 |
| | | | 700/282 |
| 2016/0186531 A1* | 6/2016 | Harkless | E21B 33/13 |
| | | | 702/6 |
| 2017/0076209 A1* | 3/2017 | Sisk | G05B 23/0283 |
| 2017/0103103 A1* | 4/2017 | Nixon | G06F 16/2452 |
| 2017/0109684 A1* | 4/2017 | Liu | G06Q 10/063114 |
| 2017/0180214 A1* | 6/2017 | Azevedo | H04L 43/045 |
| 2017/0185943 A1* | 6/2017 | Wang | G06Q 10/0631 |
| 2018/0320505 A1* | 11/2018 | Vincelette | E21B 47/07 |
| 2018/0328159 A1 | 11/2018 | Mandava et al. | |
| 2019/0033845 A1 | 1/2019 | Cella et al. | |
| 2019/0258235 A1* | 8/2019 | Xenos | G05B 13/048 |
| 2020/0126165 A1 | 4/2020 | Galle et al. | |
| 2020/0293971 A1* | 9/2020 | Moynet | G06Q 10/20 |
| 2021/0332684 A1* | 10/2021 | Madasu | E21B 47/135 |
| 2022/0197306 A1* | 6/2022 | Cella | G06Q 10/06311 |

FOREIGN PATENT DOCUMENTS

| | | | |
|---|---|---|---|
| WO | 2019173840 A1 | 9/2019 | |
| WO | 2019231798 A1 | 12/2019 | |

* cited by examiner

DYNAMIC BALANCING OF WELL CONSTRUCTION AND WELL OPERATIONS PLANNING AND RIG EQUIPMENT TOTAL COST OF OWNERSHIP

CROSS-REFERENCE TO RELATED APPLICATIONS

This application is a National Stage Entry of PCT Patent Application No. PCT/2018/054796, entitled "DYNAMIC BALANCING OF WELL CONSTRUCTION AND WELL OPERATIONS PLANNING AND RIG EQUIPMENT TOTAL COST OF OWNERSHIP," filed on Oct. 8, 2018, which claims priority to and the benefit of U.S. Provisional Application No. 62/568,842, entitled "DYNAMIC BAL-ANCING OF WELL CONSTRUCTION PLANNING AND RIG EQUIPMENT TOTAL COST OF OWNERSHIP," filed Oct. 6, 2017, the entire disclosure of which is hereby incorporated by reference.

BACKGROUND OF THE INVENTION

Wells are generally drilled into the ground or ocean bed to recover natural deposits of oil, gas, and other materials that are trapped in subterranean formations. Well construction operations (e.g., drilling operations) may be performed at a wellsite by a drilling system having various surface and subterranean equipment operating in a coordinated manner. A drilling system may utilize a drill bit attached to the lower end of a drill string to drill a well. Drilling fluid may be pumped from a wellsite surface down through the drill string to the drill bit. The drilling fluid lubricates and cools the drill bit, and may additionally carry drill cuttings from the wellbore back to the wellsite surface. Wellsite equipment may be grouped into various subsystems, wherein each subsystem performs a different operation controlled by a corresponding local and/or a remotely located controller.

Condition monitoring is a process of monitoring equipment condition indicators for changes to identify future faults, failures, breakdowns, and other maintenance problems associated with equipment. Condition monitoring is increasingly utilized in the oil and gas industry as part of predictive maintenance of wellsite (e.g., drilling) equipment. Condition monitoring utilizes condition data generated by peripheral (e.g., add-on) sensors and instruments to gain more insight to the future maintenance problems. Condition data, such as vibration data, acoustic data, thermographic (e.g., infrared signature) data, is used solely to indicate condition of equipment. Condition monitoring also includes analyzing operational data to determine amount of equipment usage and compare the determined equipment usage to expected operational lifetime specifications and/or calculations.

However, current condition monitoring does not take into account effects of operational conditions/parameters imposed on equipment during resource production, nor does it correlate the effects of such operational conditions/parameters to cost of catastrophic and/or wear-based equipment failure and/or to impact on equipment asset life (and/or equipment maintenance costs based on accelerated, instead of normal, wear).

Traditional drilling contractors focus on maximizing the life of their asset, the rig, and reducing as much as possible the loading of equipment to minimize wear and tear, and therefore reduce cost of service delivery (COSD). Typical drilling contracts create an incentive for a drilling contractor at any given wellsite not to push the equipment and not to drill fast or operate aggressively. This fundamentally contradicts the objective of the resource production wellsite operators of delivering wells as quickly as possible taking full advantage of the rig capacity, within safety limits. As such, decisions related to equipment parameters setting to execute an operational plan or drilling program have traditionally been based mostly on the various parties' anecdotal experience and gut feel, without clearly understand how this impact both the life of the rig and the drilling performance.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a computer program product including a non-transitory, computer-readable medium having instructions that, when executed by a processor of a processing system, cause the processing system to receive sensor measurements each generated by a corresponding sensor of a piece of equipment at a wellsite during operation of the piece of equipment, generate a condition indicator for each sensor based on a corresponding sensor measurement, record each condition indicator over a period of time, determine a condition of the piece of equipment based on at least one of the recorded condition indicators, and develop or refine a digital avatar that includes a model correlating operation of the piece of equipment over time with a progression of the recorded condition indicators to predict future changes in condition of the piece of equipment.

The present disclosure also introduces a computer program product including a non-transitory, computer-readable medium having instructions that, when executed by a processor of a processing system, cause the processing system to determine first data, or receive the first data as input. The first data is determined based at least partially on details of a well construction and/or well operation plan for a wellsite. The first data includes a cost of production of a resource from the wellsite, a cost of equipment used for production of the resource from the wellsite, a predicted profit from production of the resource from the wellsite, or a combination thereof. The instructions, when executed by the processor, also cause the processing system to predict a future progression of conditions of one or more pieces of equipment at the wellsite over time during operation of the plan, based at least partially on details of the plan and second data reflecting an existing progression of conditions of a digital avatar representing the one or more pieces of equipment during operation.

The present disclosure also introduces a method including causing operation of a piece of equipment at a wellsite to perform actions by the piece of equipment and generate sensor measurements each indicative of a corresponding one of the actions. The method also includes causing operation of a processing system to generate a condition indicator for the piece of equipment based on a corresponding sensor measurement, record instances of the condition indicator over a period of time, determine a condition of the piece of equipment based on at least one of the recorded condition indicators, and develop or refine a digital avatar that includes a model correlating operation of the piece of equipment over time with a progression of the recorded condition indicators to predict future changes in the condition of the piece of equipment.

The present disclosure also introduces a method that includes calculating based on details of a well construction and/or well operation plan for a wellsite, or receiving as input that is determined based on the plan details, a cost of production of a resource from the wellsite, a cost of equipment used for production of the resource from the wellsite, a predicted profit from production of the resource from the wellsite, or a combination thereof. The method also includes predicting, based on the plan details and data reflecting an existing progression of conditions of a digital avatar representing one or more pieces of equipment during operation, a future progression of conditions of the one or more pieces of equipment at the wellsite over time during operation of the plan.

The present disclosure also introduces a system including a piece of equipment at a wellsite, the piece of equipment including sensors each operable to generate a signal indicative of an operational parameter associated with a corresponding action of the piece of equipment. The system also includes a processing system having a processor and a memory storing a computer program code that, when executed, causes the processing system to receive signals from the sensors during operation of the piece of equipment at the wellsite, generate a condition indicator for each action based on a corresponding signal, record each condition indicator over a period of time, determine a condition of the piece of equipment based on at least one of the condition indicators recorded over time, and develop or refine a digital avatar that includes a model correlating operation of the piece of equipment over time with a progression of the condition indicators recorded over time to predict future changes in condition of the piece of equipment over time.

The present disclosure also introduces a system including a piece of equipment at a wellsite, the piece of equipment including sensors each operable to generate a signal indicative of an operational parameter associated with a corresponding action of the piece of equipment. The system also includes a processing system having a processor and a memory storing a computer program code that, when executed, causes the processing system to calculate based on details of a well construction and/or well operation plan for the wellsite, or receive as input, a cost of production of a resource from the wellsite, a cost of equipment used for production of the resource from the wellsite, a predicted profit from production of the resource from the wellsite, or a combination thereof. The computer program code, when executed, also causes the processing system to predict, based on details of a well construction and/or well operation plan for a wellsite and based on data reflecting a progression of conditions of a digital avatar representing the piece of equipment during operation, a progression of conditions of the piece of equipment at the wellsite over time during operation of the plan.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
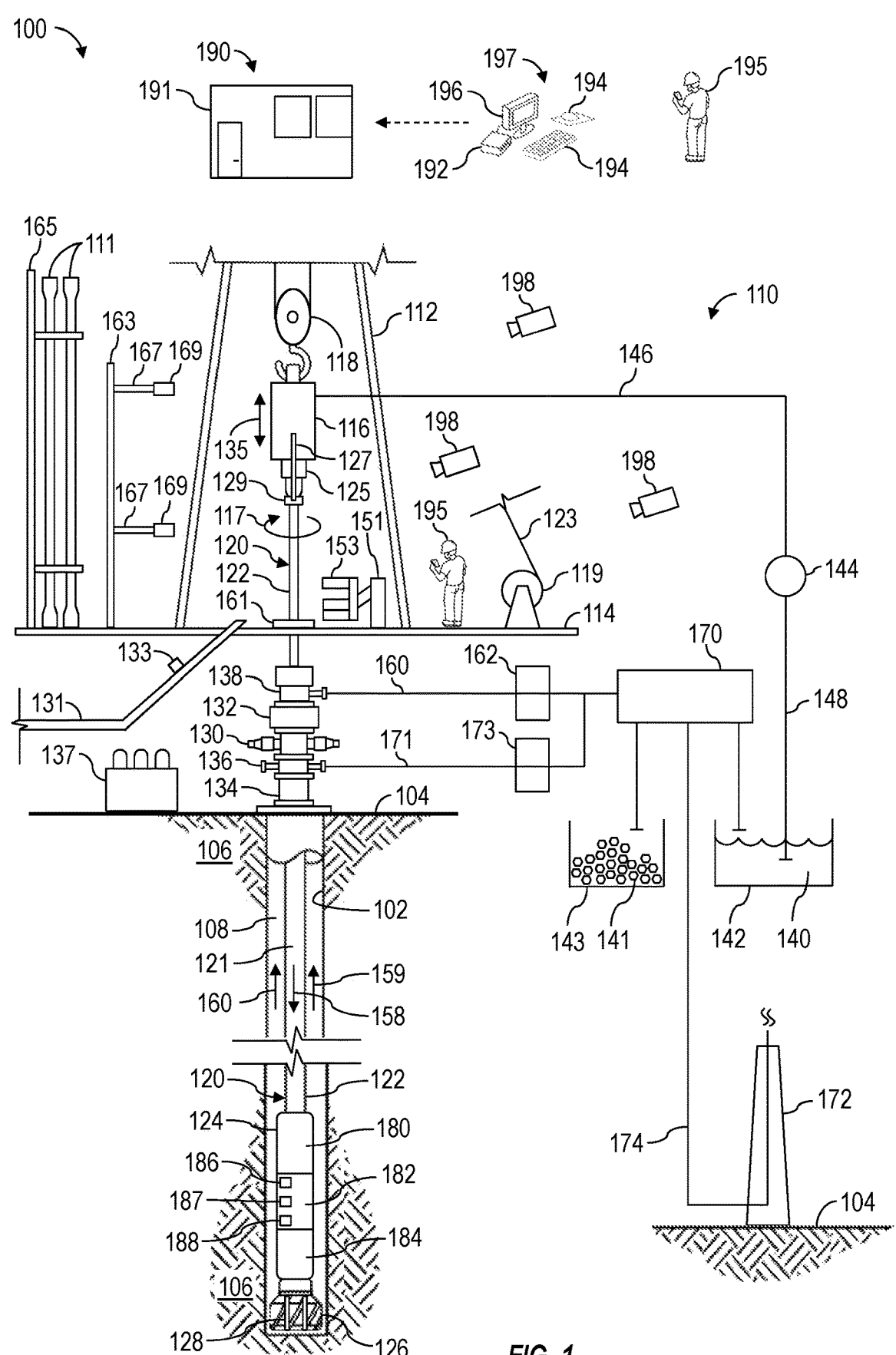
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

FIG. 1 is a schematic view of at least a portion of an example implementation of a well construction system 100 according to one or more aspects of the present disclosure. The well construction system 100 represents an example environment in which one or more aspects of the present disclosure described below may be implemented. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise drill pipe, heavy-weight drill pipe (HWDP), wired drill pipe (WDP), tough logging condition (TLC) pipe, coiled tubing, and/or other means for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor (not shown) connected with the drill bit 126.

The BHA 124 may also include various downhole tools 180, 182, 184. One or more of such downhole tools 180, 182, 184 may be or comprise an acoustic tool, a density tool, a directional drilling tool, an electromagnetic (EM) tool, a formation sampling tool, a formation testing tool, a gravity tool, a monitoring tool, a neutron tool, a nuclear tool, a photoelectric factor tool, a porosity tool, a reservoir characterization tool, a resistivity tool, a rotational speed sensing tool, a sampling-while-drilling (SWD) tool, a seismic tool, a surveying tool, a torsion sensing tool, and/or other measuring-while-drilling (MWD) or logging-while-drilling (LWD) tools.

One or more of the downhole tools 180, 182, 184 may be or comprise an MWD or LWD tool comprising a sensor package 186 operable for the acquisition of measurement data pertaining to the BHA 124, the wellbore 102, and/or the formation 106. One or more of the downhole tools 180, 182, 184 and/or another portion of the BHA 124 may also comprise a telemetry device 187 operable for communication with the surface equipment 110, such as via mud-pulse telemetry. One or more of the downhole tools 180, 182, 184 and/or another portion of the BHA 124 may also comprise a downhole processing device 188 operable to receive, process, and/or store information received from the surface equipment 110, the sensor package 186, and/or other portions of the BHA 124. The processing device 188 may also store executable computer programs (e.g., program code instructions), including for implementing one or more aspects of the operations described herein.

The support structure 112 may support a driver, such as a top drive 116, operable to connect (perhaps indirectly) with an uphole end of the conveyance means 122, and to impart rotary motion 117 and vertical motion 135 to the drill string 120 and the drill bit 126. However, another driver, such as a kelly and rotary table (neither shown), may be utilized instead of or in addition to the top drive 116 to impart the rotary motion 117. The top drive 116 and the connected drill string 120 may be suspended from the support structure 112 via hoisting equipment, which may include a traveling block 118, a crown block (not shown), and a draw works 119 storing a support cable or line 123. The crown block may be connected to or otherwise supported by the support structure 112, and the traveling block 118 may be coupled with the top drive 116, such as via a hook. The draw works 119 may be mounted on or otherwise supported by the rig floor 114. The crown block and traveling block 118 comprise pulleys or sheaves around which the support line 123 is reeved to operatively connect the crown block, the traveling block 118, and the draw works 119 (and perhaps an anchor). The draw works 119 may thus selectively impart tension to the support line 123 to lift and lower the top drive 116, resulting in the vertical motion 135. The draw works 119 may comprise a drum, a frame, and a prime mover (e.g., an engine or motor) (not shown) operable to drive the drum to rotate and reel in the support line 123, causing the traveling block 118 and the top drive 116 to move upward. The draw works 119 may be operable to release the support line 123 via a controlled rotation of the drum, causing the traveling block 118 and the top drive 116 to move downward.

The top drive 116 may comprise a grabber, a swivel (neither shown), a tubular handling assembly links 127 terminating with an elevator 129, and a drive shaft 125 operatively connected with a prime mover (not shown), such as via a gear box or transmission (not shown). The drill string 120 may be mechanically coupled to the drive shaft 125 with or without a sub saver between the drill string 120 and the drive shaft 125. The prime mover may be selectively operated to rotate the drive shaft 125 and the drill string 120 coupled with the drive shaft 125. Hence, during drilling operations, the top drive 116 in conjunction with operation of the draw works 119 may advance the drill string 120 into the formation 106 to form the wellbore 102. The tubular handling assembly links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The well construction system 100 may further include a well control system for maintaining well pressure control. For example, the drill string 120 may be conveyed within the wellbore 102 through various blowout preventer (BOP) equipment disposed at the wellsite surface 104 on top of the wellbore 102 and perhaps below the rig floor 114. The BOP equipment may be operable to control pressure within the wellbore 102 via a series of pressure barriers (e.g., rams) between the wellbore 102 and the wellsite surface 104. The BOP equipment may include a BOP stack 130, an annular preventer 132, and/or a rotating control device (RCD) 138 mounted above the annular preventer 132. The BOP equipment 130, 132, 138 may be mounted on top of a wellhead 134. The well control system may further include a BOP control unit 137 (i.e., a BOP closing unit) operatively connected with the BOP equipment 130, 132, 138 and operable to actuate, drive, operate or otherwise control the BOP equipment 130, 132, 138. The BOP control unit 137 may be or comprise a hydraulic fluid power unit fluidly connected with the BOP equipment 130, 132, 138 and selectively operable to hydraulically drive various portions (e.g., rams, valves, seals) of the BOP equipment 130, 132, 138.

The well construction system 100 may further include a drilling fluid circulation system operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid (i.e., mud) 140, and a pump 144 operable to move the drilling fluid 140 from the container 142 into the internal fluid passage 121 of the drill string 120 via a fluid conduit 146 extending from the pump 144 to the top drive 116 and an internal passage extending through the top drive 116. The fluid conduit 146 may comprise one or more of a pump discharge line, a stand pipe, a rotary hose, and a gooseneck (not shown) connected with a fluid inlet of the top drive 116. The pump 144 and the container 142 may be fluidly connected by a fluid conduit 148, such as a suction line.

During drilling operations, the drilling fluid may continue to flow downhole through the internal fluid passage 121 of the drill string 120, as indicated by directional arrow 158. The drilling fluid may exit the BHA 124 via ports 128 in the drill bit 126 and then circulate uphole through an annular space 108 ("annulus") of the wellbore 102 defined between an exterior of the drill string 120 and the wall of the wellbore 102, such flow being indicated by directional arrows 159. In this manner, the drilling fluid lubricates the drill bit 126 and carries formation cuttings uphole to the wellsite surface 104. The returning drilling fluid may exit the annulus 108 via the RCD 138 and/or via a spool, a wing valve, a bell nipple, or another ported adapter 136, which may be located below one or more portions of the BOP stack 130.

The drilling fluid exiting the annulus 108 via the RCD 138 may be directed into a fluid conduit 160 (e.g., a drilling pressure control line), and may pass through various wellsite equipment fluidly connected along the conduit 160 prior to being returned to the container 142 for recirculation. For example, the drilling fluid may pass through a choke manifold 162 (e.g., a drilling pressure control choke manifold) connected along the conduit 160. The choke manifold 162 may include at least one choke and a plurality of fluid valves (neither shown) collectively operable to control the flow through and out of the choke manifold 162. Backpressure may be applied to the annulus 108 by variably restricting flow of the drilling fluid or other fluids flowing through the choke manifold 162. The greater the restriction to flow through the choke manifold 162, the greater the backpressure applied to the annulus 108.

The drilling fluid may also or instead exit the annulus 108 via the ported adapter 136 and into a fluid conduit 171 (e.g., rig choke line), and may pass through various equipment fluidly connected along the conduit 171 prior to being returned to the container 142 for recirculation. For example, the drilling fluid may pass through a choke manifold 173 (e.g., a rig choke manifold) connected along the conduit 171. The choke manifold 173 may include at least one choke and a plurality of fluid valves (neither shown) collectively operable to control the flow through the choke manifold 173. Backpressure may be applied to the annulus 108 by variably restricting flow of the drilling fluid or other fluids flowing through the choke manifold 173.

Before being returned to the container 142, the drilling fluid returning to the wellsite surface 104 may be cleaned and/or reconditioned via drilling fluid reconditioning equipment 170, which may include one or more of liquid gas separators, shale shakers, centrifuges, and other drilling fluid cleaning equipment. The liquid gas separators may remove formation gasses entrained in the drilling fluid discharged from the wellbore 102 and the shale shakers may separate and remove solid particles 141 (e.g., drill cuttings) from the drilling fluid. The drilling fluid reconditioning equipment 170 may further comprise equipment operable to remove additional gas and finer formation cuttings from the drilling fluid and/or modify physical properties or characteristics (e.g., rheology) of the drilling fluid. For example, the drilling fluid reconditioning equipment 170 may include a degasser, a desander, a desilter, a mud cleaner, and/or a decanter, among other examples. Intermediate tanks/containers (not shown) may be utilized to hold the drilling fluid while the drilling fluid progresses through the various stages or portions of the drilling fluid reconditioning equipment 170. The cleaned/reconditioned drilling fluid may be transferred to the fluid container 142, the solid particles 141 removed from the drilling fluid may be transferred to a solids container 143 (e.g., a reserve pit), and/or the removed gas may be transferred to a flare stack 172 via a conduit 174 (e.g., a flare line) to be burned or to a container (not shown) for storage and removal from the wellsite.

The surface equipment 110 may include tubular handling equipment operable to store, move, connect, and disconnect tubulars (e.g., drill pipes) to assemble and disassemble the conveyance means 122 of the drill string 120 during drilling operations. For example, a catwalk 131 may be utilized to convey tubulars from a ground level, such as along the wellsite surface 104, to the rig floor 114, permitting the tubular handling assembly links 127 to grab and lift the tubulars above the wellbore 102 for connection with previously deployed tubulars. The catwalk 131 may have a horizontal portion and an inclined portion that extends between the horizontal portion and the rig floor 114. The catwalk 131 may comprise a skate 133 movable along a groove (not shown) extending longitudinally along the horizontal and inclined portions of the catwalk 131. The skate 133 may be operable to convey (e.g., push) the tubulars along the catwalk 131 to the rig floor 114. The skate 133 may be driven along the groove by a drive system (not shown), such as a pulley system or a hydraulic system. Additionally, one or more racks (not shown) may adjoin the horizontal portion of the catwalk 131. The racks may have a spinner unit for transferring tubulars to the groove of the catwalk 131.

An iron roughneck 151 may be positioned on the rig floor 114. The iron roughneck 151 may comprise a torqueing portion 153, such as may include a spinner and a torque wrench comprising a lower tong and an upper tong. The torqueing portion 153 of the iron roughneck 151 may be movable toward and at least partially around the drill string 120, such as may permit the iron roughneck 151 to make up and break out connections of the drill string 120. The torqueing portion 153 may also be movable away from the drill string 120, such as may permit the iron roughneck 151 to move clear of the drill string 120 during drilling operations. The spinner of the iron roughneck 151 may be utilized to apply low torque to make up and break out threaded connections between tubulars of the drill string 120, and the torque wrench may be utilized to apply a higher torque to tighten and loosen the threaded connections.

Reciprocating slips 161 may be located on the rig floor 114, such as may accommodate therethrough the downhole tubulars during make up and break out operations and during the drilling operations. The reciprocating slips 161 may be in an open position during drilling operations to permit advancement of the drill string 120 therethrough, and in a closed position to clamp an upper end of the conveyance means 122 (e.g., assembled tubulars) to thereby suspend and prevent advancement of the drill string 120 within the wellbore 102, such as during the make up and break out operations.

During drilling operations, the hoisting equipment lowers the drill string 120 while the top drive 116 rotates the drill string 120 to advance the drill string 120 downward within the wellbore 102 and into the formation 106. During the advancement of the drill string 120, the reciprocating slips 161 are in an open position, and the iron roughneck 151 is moved away or is otherwise clear of the drill string 120. When the upper portion of the tubular in the drill string 120 that is made up to the drive shaft 125 is near the reciprocating slips 161 and/or the rig floor 114, the top drive 116 ceases rotating and the reciprocating slips 161 close to clamp the tubular made up to the drive shaft 125. The grabber of the top drive 116 then clamps the upper portion of the tubular made up to the drive shaft 125, and the drive shaft 125 rotates in a direction reverse from the drilling rotation to break out the connection between the drive shaft 125 and the made up tubular. The grabber of the top drive 116 may then release the tubular of the drill string 120.

Multiple tubulars may be loaded on the rack of the catwalk 131 and individual tubulars (or stands of two or three tubulars) may be transferred from the rack to the groove in the catwalk 131, such as by the spinner unit. The tubular positioned in the groove may be conveyed along the groove by the skate 133 until an end of the tubular projects above the rig floor 114. The elevator 129 of the top drive 116 then grasps the protruding end, and the draw works 119 is operated to lift the top drive 116, the elevator 129, and the new tubular.

The hoisting equipment then raises the top drive 116, the elevator 129, and the tubular until the tubular is aligned with the upper portion of the drill string 120 clamped by the slips 161. The iron roughneck 151 is moved toward the drill string 120, and the lower tong of the torqueing portion 153 clamps onto the upper portion of the drill string 120. The spinning system rotates the new tubular (e.g., a threaded male end) into the upper portion of the drill string 120 (e.g., a threaded female end). The upper tong then clamps onto the new tubular and rotates with high torque to complete making up the connection with the drill string 120. In this manner, the new tubular becomes part of the drill string 120. The iron roughneck 151 then releases and moves clear of the drill string 120.

The grabber of the top drive 116 may then clamp onto the drill string 120. The drive shaft 125 (e.g., a threaded male end) is brought into contact with the drill string 120 (e.g., a threaded female end) and rotated to make up a connection between the drill string 120 and the drive shaft 125. The grabber then releases the drill string 120, and the reciprocating slips 161 are moved to the open position. The drilling operations may then resume.

The tubular handling equipment may further include a pipe handling manipulator (PHM) 163 disposed in association with a fingerboard 165. Although the PHM 163 and the fingerboard 165 are shown supported on the rig floor 114, one or both of the PHM 163 and fingerboard 165 may be located on the wellsite surface 104 or another area of the well construction system 100. The fingerboard 165 provides storage (e.g., temporary storage) of tubulars (or stands of two or three tubulars) 111 during various operations, such as during and between tripping out and tripping in the drill string 120. The PHM 163 may be operable to transfer the tubulars 111 between the fingerboard 165 and the drill string 120 (i.e., space above the suspended drill string 120). For example, the PHM 163 may include arms 167 terminating with clamps 169, such as may be operable to grasp and/or clamp onto one of the tubulars 111. The arms 167 of the PHM 163 may extend and retract, and/or at least a portion of the PHM 163 may be rotatable and/or movable toward and away from the drill string 120, such as may permit the PHM 163 to transfer the tubular 111 between the fingerboard 165 and the drill string 120.

To trip out the drill string 120, the top drive 116 is raised, the reciprocating slips 161 are closed around the drill string 120, and the elevator 129 is closed around the drill string 120. The grabber of the top drive 116 clamps the upper portion of the tubular made up to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 151 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 151 then releases the drill string 120 and moves clear of the drill string 120.

The PHM 163 may then move toward the drill string 120 to grasp the tubular suspended from the elevator 129. The elevator 129 then opens to release the tubular. The PHM 163 then moves away from the drill string 120 while grasping the tubular with the clamps 169, places the tubular in the fingerboard 165, and releases the tubular for storage in the fingerboard 165. This process is repeated until the intended length of drill string 120 is removed from the wellbore 102.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA 124, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or set-points, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

In some embodiments, such as shown in FIG. 1, the well construction system 100 may optionally include stationary and/or mobile video cameras 198 disposed or utilized at various locations within the well construction system 100. The video cameras 198 may capture videos of various portions, equipment, or subsystems of the well construction system 100, and perhaps the wellsite operators 195 and the actions they perform, during or otherwise in association with the well site operations, including while performing repairs to the well construction system 100 during a breakdown. For example, the video cameras 198 may capture digital images (or video frames) of the entire well construction system 100 and/or specific portions of the well construction system 100, such as the top drive 116, the iron roughneck 151, the PHM 163, the fingerboard 165, and/or the catwalk 131, among other examples. The video cameras 198 may generate corresponding video signals (i.e., feeds) comprising or otherwise indicative of the captured digital images. The video cameras 198 may be in signal communication with the processing device 192, such as may permit the video signals to be processed and transmitted to the control workstation 197 and, thus, permit the wellsite operators 195 to view various portions or components of the well construction system 100 on one or more of the output devices 196. The processing device 192 or another portion of the control workstation 197 may be operable to record the video signals generated by the video cameras 198.

In some embodiments, whether alternatively or in addition to video cameras 198, various additional sensors (not exhaustively shown in FIG. 1, but similar to PHM 163 and/or similar to sensor package 186 on BHA 124) may monitor various portions or components of the well construction system 100, such as during operation. This monitoring of various portions or components of the well construction system 100 may advantageously enable correlation between predetermined operating parameters of a well construction and/or well operation plan and near-future and/or future progressing condition of each of the various portions or components of the well construction system 100, for example to develop and/or refine a model of behavior/response of each of the various portions or components of the well construction system 100 to the various predetermined operating parameters of the well construction and/or well operation plan.

Non-limiting examples of such portions or components can include top drive system, top drive blower motor, top drive lubricant pump motor, top drive lubricant pump blower motor, top drive lubricant circulation system, top drive lubricant system filter, top drive lubricant fluid, top drive motor, top drive motor drive end bearing, top drive motor winding, top drive gearbox main shaft, top drive thrust bearing, drawworks system, drawworks lubricant oil pump motor, drawworks blower motor, drawworks gearbox pump, drawworks gearbox system, drawworks gearbox lubricant/oil system, drawworks gearbox bearing, drawworks transmission system, drawworks transmission pump, drawworks transmission reservoir, drawworks transmission lubricant/oil system, drawworks motor, drawworks motor drive end bearing, drawworks motor non-drive end bearing, drawworks motor winding, drawworks air brake, drawworks brake plate, drawworks drum driller side bearing, drawworks drum off driller side bearing, mud pump motor drive end bearing, mud pump motor non-drive end bearing, mud pump motor winding, mud pump motor, mud pump skid charge pump motor, mud pump blower motor, mud pump agitator motor, mud pump liner wash pump motor, mud pump lubricant oil pump motor, mud pump lubricant oil cooling fan, mud pump lubricant oil filter, mud pump lubricant oil power end system, mud pump liner wash system, mud pump system, resistor bank exhaust system, GenSet system, HPU lubricant oil system, and the like, and combinations thereof.

Non-limiting examples of parameters (e.g., predetermined operating parameters) measured by sensors can include top drive blower motor current, top drive lubricant pump motor current, top drive lubricant pump blower motor current, top drive lubricant oil temperature, top drive lubricant system filter in pressure, top drive lubricant system filter out pressure, top drive lubricant system small particle occupancy rate, top drive lubricant system large particle content, top drive lubricant system total (large plus small) particle occupancy rate, top drive lubricant fluid relative permittivity at ~40° C., top drive lubricant fluid conductivity at ~40° C., top drive lubricant fluid relative humidity at ~20° C., top drive motor drive end bearing temperature, top drive motor winding temperature, top drive motor torque, top drive gearbox main shaft rpm, top drive gearbox main shaft torque, top drive thrust bearing temperature, number of top drive interlock overrides (e.g., in the past ~24-hour period), number of top drive zone management system lock outs, number of top drive zone management system active alarms, number of top drive high priority alarms, number of top drive low priority alarms, drawworks lubricant oil pump motor current, drawworks blower motor current, drawworks gearbox pump pressure, drawworks gearbox inlet pressure, drawworks gearbox lubricant/oil inlet pressure, drawworks gearbox temperature, drawworks gearbox bearing temperature, drawworks gearbox oil level, drawworks gearbox oil total ferrous particle rate, drawworks gearbox oil total non-ferrous particle rate, drawworks gearbox oil total particle rate, drawworks gearbox oil total ferrous particle mass rate, drawworks gearbox oil total non-ferrous particle mass rate, drawworks gearbox oil total particle mass rate, drawworks gearbox oil total ferrous particle content, drawworks gearbox oil total non-ferrous particle content, drawworks gearbox oil total particle content, drawworks transmission inlet pressure, drawworks transmission pump pressure, drawworks transmission reservoir oil temperature, drawworks transmission reservoir oil level, drawworks transmission oil total ferrous particle rate, drawworks transmission oil total non-ferrous particle rate, drawworks transmission oil total particle rate, drawworks transmission oil total ferrous particle content, drawworks transmission oil total non-ferrous particle content, drawworks transmission oil total particle content, drawworks transmission oil total ferrous particle mass rate, drawworks transmission oil total non-ferrous particle mass rate, drawworks transmission oil total particle mass rate, drawworks motor power, drawworks motor drive end bearing temperature, drawworks motor non-drive end bearing temperature, drawworks motor winding temperature, drawworks motor torque, drawworks air brake pressure, drawworks brake plate temperature, drawworks drum driller side bearing temperature, drawworks drum off driller side bearing temperature, number of drawworks interlock overrides (e.g., in the past ~24-hour period), number of drawworks zone management system lock outs, number of drawworks zone management system active alarms, number of drawworks high priority alarms, number of drawworks low priority alarms, mud pump motor drive end bearing temperature, mud pump motor non-drive end bearing temperature, mud pump motor winding temperature, mud pump motor torque, mud pump skid charge pump motor (average) current, mud pump blower motor current, mud pump agitator motor current, mud pump liner wash pump motor current, mud pump lubricant oil pump motor current, mud pump lubricant oil cooling fan current, mud pump lubricant oil filter inlet pressure, mud pump lubricant oil filter outlet pressure, mud pump lubricant oil power end lubricant oil temperature, mud pump liner wash pressure, mud pump liner wash temperature, number of mud pump interlock overrides (e.g., in the past ~24-hour period), number of mud pump high priority alarms, number of mud pump low priority alarms, resistor bank exhaust air temperature, GenSet system power, percentage of GenSet system power limit, HPU lubricant oil system particle content, and combinations thereof.

Table 1 below describes an example of the relative impact (high, med, or low) of various well construction and/or well operation parameters on various wellsite equipment systems.

The hoisting system 211 may include one or more of the support structure 112, the drill string hoisting system or equipment (e.g., the draw works 119 and the top drive 116), and/or other equipment. The fluid (e.g., drilling mud) circulation system 212 may include one or more of the drilling fluid 140, the pumps 144, drilling fluid loading equipment, the drilling fluid reconditioning equipment 170, the flare stack 172, and/or other fluid control equipment. Accordingly, the fluid control system 212 may perform fluid operations of the well construction system 100. The rotating system 213 may include one or more of the drill string drivers (e.g., the top drive 116 and/or the rotary table and kelly), the drill string 120/BHA 124, including downhole tools 180, 182, and 184, and/or other equipment. The power system 214 may include electric generators and/or other equipment. The well control system 215 may comprise one or more of the BOP equipment 130, 132, 138, the BOP control unit 137, a BOP control station (not shown) for controlling the BOP control unit 137, downhole pressure sensors 186, and/or other equipment. The CCTV system 216, when present, may include the video cameras 198 and optionally also corresponding actuators (e.g., motors) for moving or otherwise controlling direction of the video cameras 198. The CCTV system 216, when present, may be utilized to capture real-time video of various portions or subsystems 211-215 of the well construction system 100 and

TABLE 1

| Well Construction/ Operation Parameter | Hoisting System | Fluid (Mud) Circulating System | Rotating System | Power System | Well Control System |
|---|---|---|---|---|---|
| Weight on bit | High | | High | High | |
| Rotary speed | | Med | High | Med | |
| Drilling torque | Med | Low | High | High | |
| Tripping speed | High | | Low | High | |
| Well trajectory | Med | High | High | Med | |
| Casing design | High | Low | Med | Med | |
| BHA design | High | Med | Med | Med | |
| Cement design | Med | High | Low | Low | |
| Mud composition | Low | High | Med | Low | Med |
| Mud hydraulics | Low | High | Med | High | Low |

Figure 2:
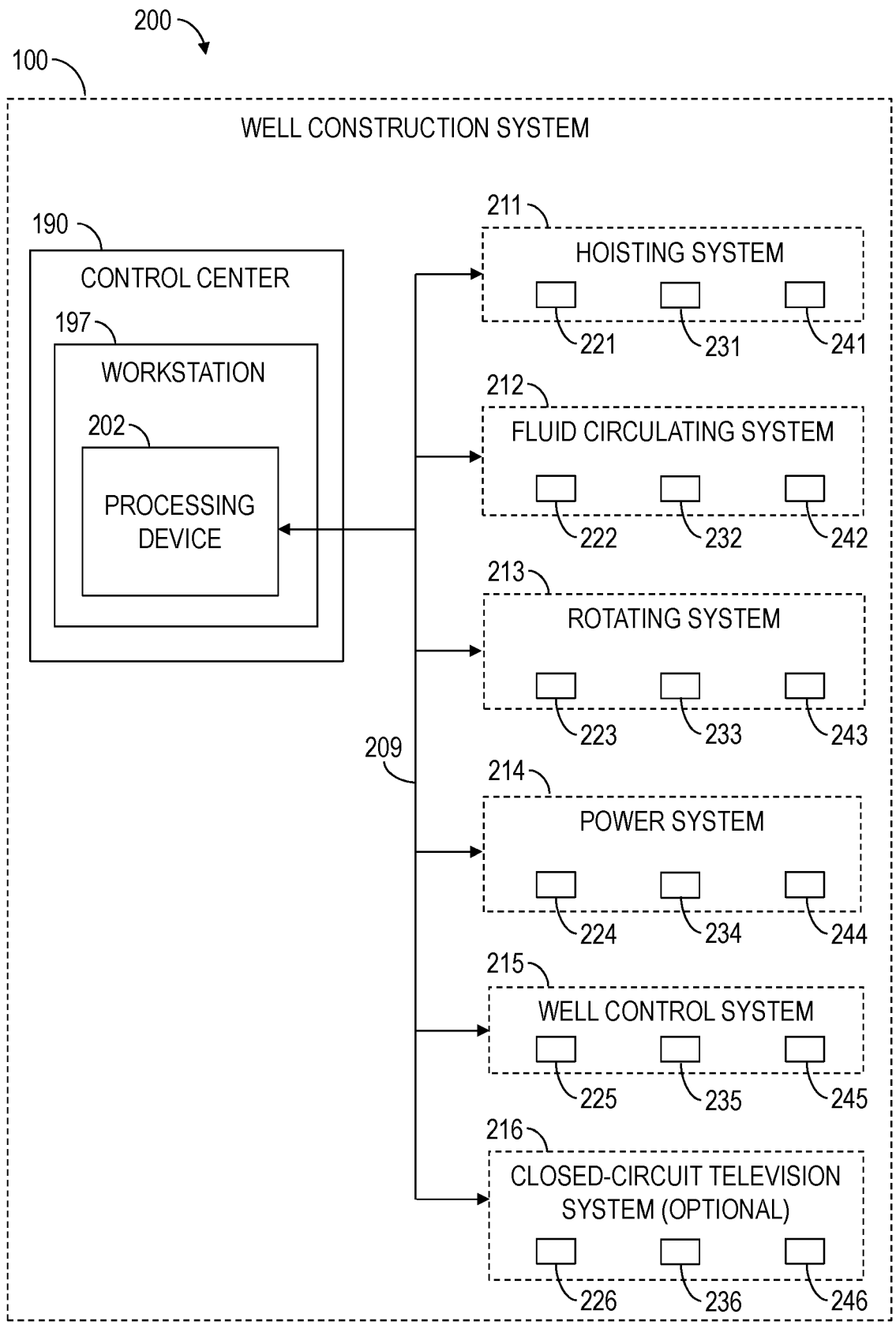
FIG. 2 is a schematic view of at least a portion of an example implementation of apparatus according to one or more aspects of the present disclosure.

The present disclosure further provides various implementations of systems and/or methods for controlling one or more portions of the well construction system 100. FIG. 2 is a schematic view of at least a portion of an example implementation of a monitoring and control system 200 for monitoring and controlling various equipment, portions, and subsystems of the well construction system 100 according to one or more aspects of the present disclosure. The following description refers to FIGS. 1 and 2, collectively.

The control system 200 may be in real-time communication with and utilized to monitor and/or control various portions, components, and equipment of the well construction system 100 described herein. The equipment of the well construction system 100 may be grouped into several subsystems, each operable to perform a corresponding operation and/or a portion of the well construction operations described herein. The subsystems may include a hoisting system 211, a fluid circulation system 212, a rotating system 213, a power system 214, a well control system 215, and optionally a closed-circuit television (CCTV) system 216 (e.g., if video cameras 198 are present). The control workstation 197 may be utilized to monitor, configure, control, and/or otherwise operate one or more of the well construction subsystems 211-216.

may display video signals from the video cameras 198 on the video output devices 196 to display in real-time the various portions or subsystems 211-215. Each of the well construction subsystems 211-216 may further comprise various communication equipment (e.g., modems, network interface cards, etc.) and communication conductors (e.g., cables), communicatively connecting the equipment (e.g., sensors and actuators) of each subsystem 211-216 with the control workstation 197 and/or other equipment. Although the wellsite equipment listed above and shown in FIG. 1 is associated with certain wellsite subsystems 211-216, such associations are merely examples that are not intended to limit or prevent such wellsite equipment from being associated with two or more wellsite subsystems 211-216 and/or different wellsite subsystems 211-216.

The control system 200 may also include various local controllers 221-226 associated with corresponding subsystems 211-216 and/or individual pieces of equipment of the well construction system 100. As described above, each well construction subsystem 211-216 may include various wellsite equipment comprising corresponding actuators 241-246 for performing operations of the well construction system 100. Each subsystem 211-216 may further include various sensors 231-236 operable to generate sensor data indicative of operational performance and/or status of the wellsite equipment of each subsystem 211-216. Although the sensors 231-236 and actuators 241-246 are each shown as a single block, it is to be understood that each sensor 231-236 and actuator 241-246 may be or comprise a plurality of sensors and actuators, whereby each actuator may perform a corresponding action of a piece of equipment or subsystem 211-216 and each sensor may generate corresponding sensor data indicative of the action performed by a corresponding actuator or of other operational parameter of the piece of equipment or subsystem 211-216.

The local controllers 221-226, the sensors 231-236, and the actuators 241-246 may be communicatively connected with a processing device 202. For example, the local controllers may be in communication with the sensors 231-236 and optionally also actuators 241-246 of the corresponding subsystems 211-216 via local communication networks (e.g., field buses, not shown) and the processing device 202 may be in communication with the subsystems 211-216 via a communication network 209 (e.g., data bus, a wide-area-network (WAN), a local-area-network (LAN), etc.). The sensor data (e.g., electronic signals, information, and/or measurements, etc.) generated by the sensors 231-236 of the subsystems 211-216 may be made available for use by processing device 202 and/or the local controllers 221-226. Similarly, control commands (e.g., signals, information, etc.) generated by the processing device 202 and/or the local controllers 221-226 may be communicated (e.g., automatically) to the equipment of the subsystems 211-216 (or to the various actuators 241-246 thereof, if present), perhaps pursuant to predetermined programming, such as to facilitate well construction, well operations, and/or other operations described herein. The processing device 202 may be or comprise the processing device 192 shown in FIG. 1. Accordingly, the processing device 202 may be communicatively connected with or form a portion of the workstation 197 and/or may be at least partially located within the control center 190.

The sensors 231-236 may be monitored and/or controlled by the processing device 202. For example, the processing device 202 may be operable to receive the sensor data from the sensors 231-236 of the wellsite subsystems 211-216 in real-time, and to provide real-time control commands to the equipment of the subsystems 211-216 based on the received sensor data. However, certain operations of the equipment of the subsystems 211-216 may be controlled by the local controllers 221-226, based on sensor data received from the sensors 231-236 and/or based on control commands received from the processing device 202.

The processing devices 188, 192, 202, the local controllers 221-226, and other controllers or processing devices of the well construction system 100 may be operable to receive program code instructions and/or sensor data from sensors (e.g., sensors 231-236), process such information, and/or generate control commands to operate controllable equipment (which may include actuators 241-246) of the well construction system 100. Accordingly, the processing devices 188, 192, 202, the local controllers 221-226, and other controllers or processing devices of the well construction system 100 may individually or collectively be referred to hereinafter as equipment controllers. Equipment controllers within the scope of the present disclosure can include, for example, programmable logic controllers (PLCs), industrial computers (IPCs), personal computers (PCs), soft PLCs, variable frequency drives (VFDs) and/or other controllers or processing devices operable to receive sensor data and/or control commands and cause operation of controllable equipment based on such sensor data and/or control commands.

The various pieces of wellsite equipment described above and shown in FIGS. 1 and 2 may each comprise one or more hydraulic and/or electrical actuators, which when actuated, may cause corresponding components or portions of the piece of equipment to perform intended actions (e.g., work, tasks, movements, operations, etc.). Each piece of equipment may further comprise a plurality of sensors, whereby one or more sensors may be associated with a component of the piece of equipment (or a corresponding actuator) and communicatively connected with an equipment controller. Each sensor may be operable to generate sensor data (e.g., electrical sensor signals or measurements) indicative of an operational (e.g., mechanical, physical) status of the corresponding component (or actuator), thereby permitting the operational status of the component/equipment to be monitored by the equipment controller. The sensor data may be utilized by the equipment controller as feedback data, permitting operational control of the piece of equipment and coordination with other equipment. Such sensor data may be indicative of performance of each individual equipment component and, collectively, of the entire piece of equipment or even of the entire rig apparatus.

Figures 3, 4:
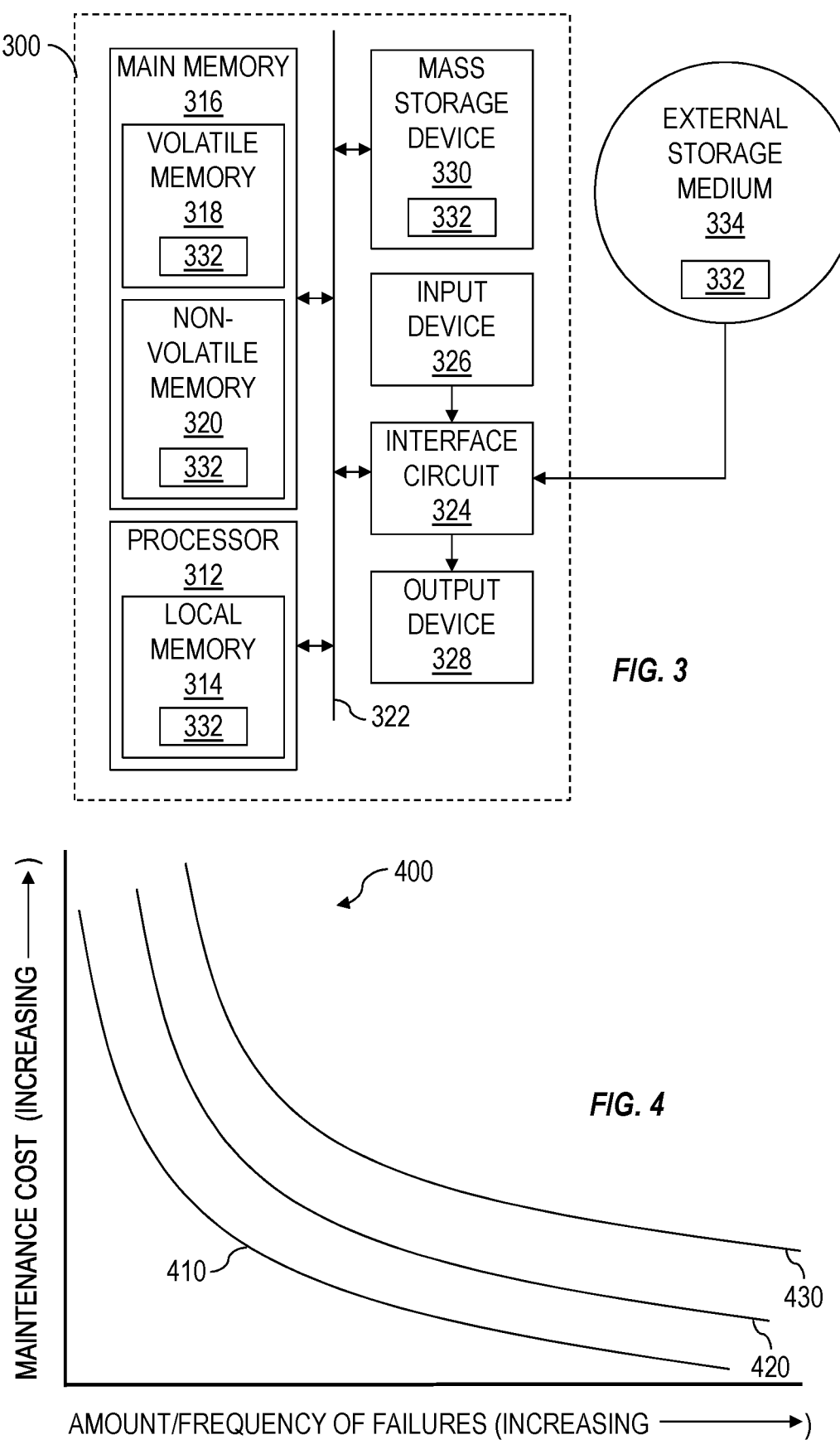
FIG. 3 is a schematic view of at least a portion of an example implementation of apparatus according to one or more aspects of the present disclosure.
FIG. 4 is a graph related to one or more aspects of the present disclosure.

FIG. 3 is a schematic view of at least a portion of an example implementation of a processing system 300 (or device) according to one or more aspects of the present disclosure. The processing system 300 may be or form at least a portion of one or more equipment controllers and/or other processing systems shown in one or more of the FIGS. 1-2. Accordingly, the following description refers to FIGS. 1-3, collectively.

The processing system 300 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing system 300 may be or form at least a portion of the processing devices 192, 202 and/or equipment controllers 221-226. Although it is possible that the entirety of the processing system 300 is implemented within one device, it is also contemplated that one or more components or functions of the processing system 300 may be implemented across multiple devices, some or an entirety of which may be at the wellsite and/or remote from the wellsite.

The processing system 300 may comprise a processor 312, such as a general-purpose programmable processor. The processor 312 may comprise a local memory 314, and may execute machine-readable and executable program code instructions 332 (i.e., computer program code) present in the local memory 314 and/or another memory device. The processor 312 may execute, among other things, the program code instructions 332 and/or other instructions and/or programs to implement the example methods, processes, and/or operations described herein. The program code instructions 332 stored in the local memory 314, when executed by the processor 312 of the processing system 300, may cause one or more portions or pieces of wellsite equipment of a well construction system to perform the example methods and/or operations described herein. The processor 312 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 312 include one or more INTEL microprocessors, microcontrollers from the ARM and/or PICO families of microcontrollers, embedded soft/hard processors in one or more FPGAs.

The processor 312 may be in communication with a main memory 316, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320.

The processing system 300 may also comprise an interface circuit 324, which is in communication with the processor 312, such as via the bus 322. The interface circuit 324 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 324 may comprise a graphics driver card. The interface circuit 324 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing system 300 may be in communication with various video cameras, sensors, actuators, equipment controllers, and other devices of the well construction system via the interface circuit 324. The interface circuit 324 can facilitate communications between the processing system 300 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 326 may also be connected to the interface circuit 324. The input devices 326 may permit human wellsite operators 195 to enter the program code instructions 332, which may be or comprise control commands, operational parameters, and/or operational setpoints. The program code instructions 332 may further comprise modeling or predictive routines, equations, algorithms, processes, engines, algorithms, applications (e.g., a performance based condition monitoring application), and/or other programs operable to calculate performance based condition indicators and predict or determine condition of a piece of equipment and/or one or more of its components based on the performance based condition indicators, as described herein. The input devices 326 may be, comprise, or be implemented by a keyboard, a mouse, a joystick, a touchscreen, a track-pad, a trackball, an isopoint, and/or a voice recognition system, among other examples. One or more output devices 328 may also be connected to the interface circuit 324. The output devices 328 may permit for visualization or other sensory perception of various data, such as sensor data, status data, and/or other example data. The output devices 328 may be, comprise, or be implemented by video output devices (e.g., an LCD, an LED display, a CRT display, a touchscreen, etc.), printers, and/or speakers, among other examples. The one or more input devices 326 and the one or more output devices 328 connected to the interface circuit 324 may, at least in part, facilitate the HMIs described herein.

The processing system 300 may comprise a mass storage device 330 for storing data and program code instructions 332. The mass storage device 330 may be connected to the processor 312, such as via the bus 322. The mass storage device 330 may be or comprise a tangible, non-transitory storage medium, such as a floppy disk drive, a hard disk drive, a compact disk (CD) drive, and/or digital versatile disk (DVD) drive, among other examples. The processing system 300 may be communicatively connected with an external storage medium 334 via the interface circuit 324. The external storage medium 334 may be or comprise a removable storage medium (e.g., a CD or DVD), such as may be operable to store data and program code instructions 332.

As described above, the program code instructions 332 may be stored in the mass storage device 330, the main memory 316, the local memory 314, and/or the removable storage medium 334. Thus, the processing system 300 may be implemented in accordance with hardware (perhaps implemented in one or more chips including an integrated circuit, such as an ASIC), or may be implemented as software or firmware for execution by the processor 312. In the case of firmware or software, the implementation may be provided as a computer program product including a non-transitory, computer-readable medium or storage structure embodying computer program code instructions 332 (i.e., software or firmware) thereon for execution by the processor 312. The program code instructions 332 may include program instructions or computer program code that, when executed by the processor 312, may cause one or more portions of the well construction system 100 to perform intended methods, processes, and/or operations disclosed herein.

FIG. 4 is a graph 400 of maintenance cost on the y-axis versus amount or frequency of equipment failures (e.g., catastrophic failures causing interruption in production of a resource from a wellsite) on the x-axis. This graph 400 may represent a single piece of equipment in resource production or alternatively a complete rig apparatus. Curves 410, 420, and 430 show relationships between equipment/rig apparatus maintenance costs and equipment failures (representing production down-time) based on varying levels of operating capacity and/or operational efficiency. Curve 410 represents production operation at approximately 70% of maximum equipment/rig capacity (or operational efficiency), with curves 420 and 430 respectively representing production operation at approximately 80% and 90% of maximum equipment/rig capacity (or operational efficiency). As can be seen qualitatively in the graph 400, higher operational capacities can typically result in increased likelihood of equipment failures, and thus of increased production down-time, which in turn represent increased cost of equipment, increased cost of resource production, and decreased profit from resource production. Additionally, increased likelihood of equipment failure typically leads to increased cost of service delivery (COSD), increased equipment maintenance costs, and decreased life (and/or life expectancy) of the equipment. To ensure equipment and operational safety, production operators typically plan to operate the rig apparatus/equipment at ~70% capacity or less, or sometimes at ~80% capacity or less, because catastrophic (down-time-inducing) equipment failures can be costly on both production and equipment sides. By merging considerations of COSD, equipment maintenance, and equipment life/life expectancy with cost of/profit from resource production, and by developing and/or refining a model of rig apparatus/equipment behavior, operation at increased capacity can be enabled with reduced likelihood of failure by predicting under what conditions equipment failure may occur. Well construction and/or well operations plans can then be modified based on those predictions to operate at or near the highest safe capacities, while performing maintenance when appropriate, but before failures are likely to occur.

Figure 5:
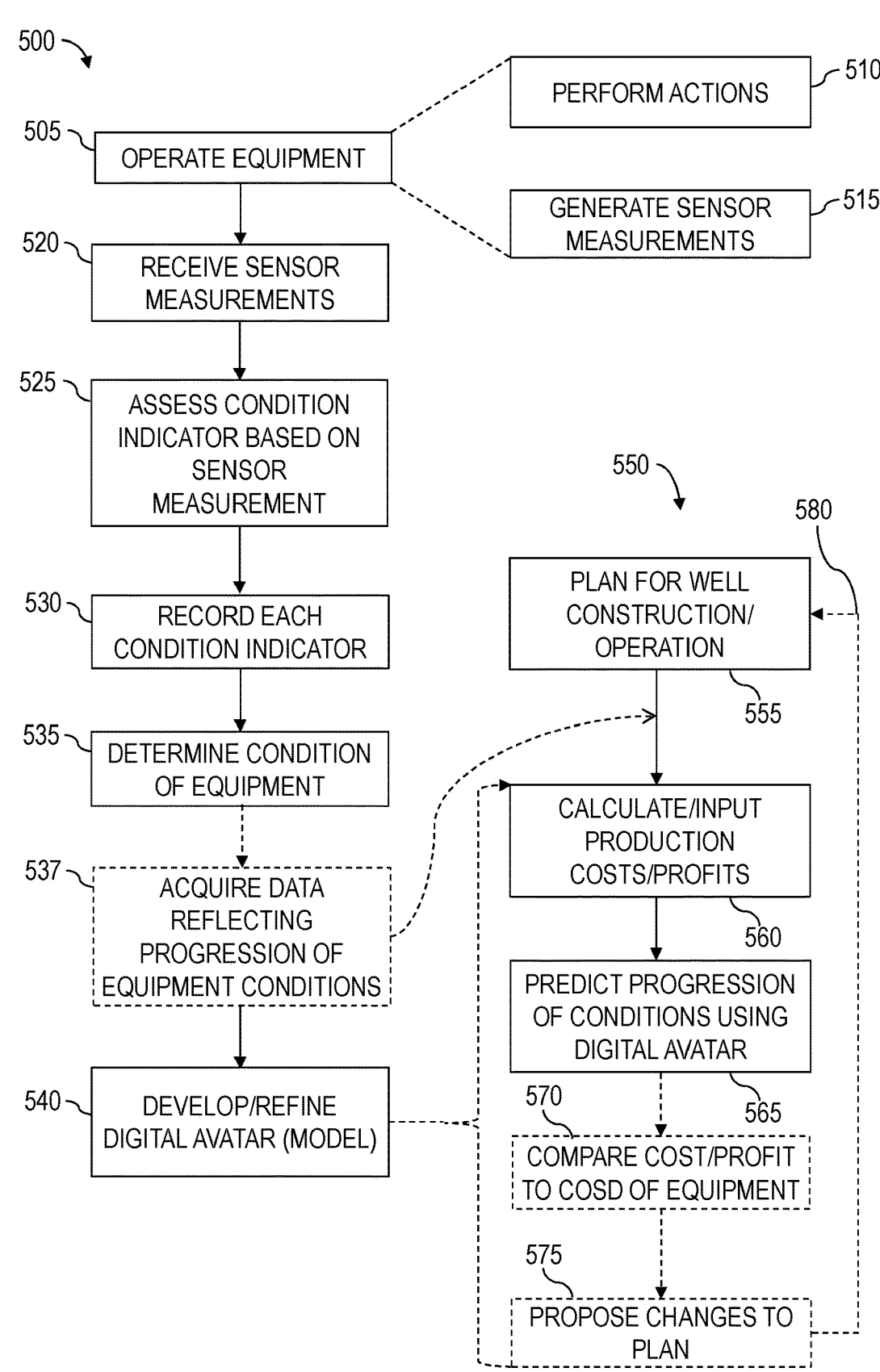
FIG. 5 is a flow-chart diagram of at least a portion of a method according to one or more aspects of the present disclosure.

FIG. 5 is a flow-chart diagram of at least a portion of an example implementation of a process or method (500) according to one or more aspects of the present disclosure. The method (500) may be performed utilizing or otherwise in conjunction with at least a portion of one or more implementations of one or more instances of the apparatus and/or systems shown in one or more of FIGS. 1-3 (e.g., well construction system 100 and/or monitoring and control system 200), and/or otherwise within the scope of the present disclosure. For example, the method (500) may be performed and/or caused, at least partially, by a processing system (e.g., processing system 300 shown in FIG. 3) executing program code instructions (e.g., program code 332 in FIG. 3) according to one or more aspects of the present disclosure. Nevertheless, the method (500) may be performed in conjunction with implementations of apparatus other than those depicted in FIGS. 1-3 that are also within the scope of the present disclosure. The method (500) can be comprised of two separate assemblages of implementations, a first (unlabeled, or simply (500)) reflecting implementations (505) through (540) and a second (550) reflecting implementations (555) through (580). Alternatively, the method (500) may be considered a single assemblage of implementations (505) through (580).

The method (500) may comprise operating (505) a piece of equipment at a wellsite by performing (510) a plurality actions by a component of the piece of equipment and generating (515) a plurality of sensor measurements, wherein each sensor measurement may be indicative of a corresponding action. The piece of equipment may represent a complete rig apparatus (e.g., well construction system 100), may represent a sub-system of a rig apparatus (e.g., one or more of the well construction subsystems 211-216), or may represent one of the individual pieces of equipment within the rig apparatus or a subsystem thereof (e.g., pump 144, top drive 116, a drawworks (not shown), or the like, or a combination thereof). The method (500) may further comprise receiving (520) the plurality of sensor measurements by a processing system (e.g., processing system 300), assessing, calculating, or determining (525) a condition indicator for each component based on a corresponding sensor measurement, recording (530) each condition indicator over a period of time, and determining (535) condition of the piece of equipment based on at least one of the condition indicators recorded over time. The assessment, calculation, or determination (525) of a condition indicator may be based on a change in the condition indicator recorded (530) over time. If desired, information related to maintenance of the piece of equipment (e.g., based on the change(s) in the condition indicator(s) recorded (530) over time) may be output when at least one of the recorded condition indicators meets or falls below a predetermined performance threshold (e.g., triggering a system fault or error, such as requiring an interlock override, resulting in a system lock out, resulting in an active alarm, resulting in a low priority alarm, and/or resulting in a high priority alarm).

At least one of the sensor measurements may be indicative of position of an actuator or component of the piece of equipment facilitating a corresponding action. Each condition indicator may be indicative of performance of a corresponding action, and determining (535) the condition of the piece of equipment may be based on change in at least one of the condition indicators recorded over time. The plurality of sensor measurements may be received (520) and the condition indicator may be assessed, calculated, or determined (525) in real-time while the actions are performed. The determining (535) of the condition of the piece of equipment may optionally but typically lead to an acquisition and/or recordation (537) of data reflecting a progression of conditions of the piece of equipment over time, based on past operations of the same piece of equipment subject to various operations conditions/parameters, and/or based on past operations of other similar pieces of equipment subject to a past history of identical or similar operations conditions or subject at some point to identical/similar operations conditions/parameters. The determined condition(s) of the piece of equipment, as well as the optionally acquired and/or recorded data from (537), may be utilized to develop and/or refine (540) a digital avatar that may include or represent a model correlating operation (and/or maintenance) of the piece of equipment over time with a progression of the condition indicators (e.g., as recorded from (537)) over time. Advantageously, the development and/or refinement (540) of the digital avatar/model may allow or enable prediction (or enhanced accuracy and/or precision of prediction) of future changes in condition of the piece of equipment over time. Also advantageously, the development and/or refinement (540) of the digital avatar/model may further comprise generating a COSD for the piece of equipment.

The method (550) may comprise calculating or receiving as input (560) costs and/or profits, such as a (total) cost of production of a resource from the wellsite, a cost of equipment used for production of the resource from the wellsite, a predicted profit from production of the resource from the wellsite, or a combination thereof. In order to enable those calculations (or as a check on the input values), a well construction and/or well operation plan (555) for the wellsite may be used as a basis. The well construction and/or well operation plan (555) may be originally created by a well engineer (such as a wellsite operator 195) without detailed knowledge of historical and/or modeled equipment performance, or considering primarily the well engineer's past resource production experience that may not fully incorporate historical and/or modeled equipment performance. If available, the calculations may be further enabled (or the input values may be checked) by used of acquired and/or recorded data (e.g., from (537)) reflecting progression of equipment conditions for equipment operated currently and/or in the past at the same wellsite and/or at (an)other wellsite(s) using similar operational conditions/parameters. Based on details (e.g., operational conditions/parameters) of the well construction and/or well operation plan (555) and optionally also on the acquired and/or recorded data (e.g., from (537)) reflecting progression of equipment conditions (which may also be reflected in the digital avatar/model, such as developed and/or refined in (540)), a progression of conditions (and/or conditions indicators) of the piece(s) of equipment can be predicted (565) at the wellsite over time during operation of the plan (555).

Optionally but advantageously, the method (550) may further comprise comparing (570) the calculated/input costs/profits from (560) to a cost of service delivery (COSD) for the piece of equipment to operate at the wellsite. Based on the comparison (570), the method (550) may further comprise proposing changes (575) to the well construction and/or well operation plan (555), e.g., to reduce or minimize one or more of the costs of production, equipment, and service delivery at the wellsite and/or to increase or maximize profit from production of the resource, based on consideration of costs of production, equipment, and service delivery at the wellsite. Although it may be typical to simply seek to reduce or minimize the cost of production (or COSD) and thus to seek to increase or maximize profit from resource production at the expense of equipment (maintenance) cost/asset life, and although it is possible to simply seek to increase or maximize equipment asset life (thereby reducing or minimizing maintenance cost) at the expense of resource production cost/profit, it is believed to be advantageous to balance all costs/profits to increase or maximize overall efficiency. If changes are proposed (575), an iterative loop (580) may be created, for example, to reflect combinatorial impact of the details (e.g., operation conditions/parameters) of the well construction and/or well operation plan (555) on the costs/profits from (560).

For example, without an educated understanding of the context of imposition of operational conditions/parameters on equipment (maintenance) cost/asset life, the well construction and/or well operation plan (555) may be either too cautious or too aggressive. A wellsite engineer (or wellsite operator 195) may often create a well construction and/or well operation plan (such as 555) that seeks to operate assuredly in a condition/parameter space (e.g., at or below curve 420, or at or below curve 410, in FIG. 4), where "normal" equipment wear is believed to occur, e.g., so as to minimize potential failure and/or equipment maintenance costs and so as to maximize equipment life. The well construction and/or well operation plan (such as 555) may thus often seek to avoid operating assuredly in a condition/parameter space (e.g., at or above curve 430 in FIG. 4) where catastrophic equipment (wear) failure is likely to (eventually) occur. The well construction and/or well operation plan (such as 555) may thus further seek to spend as little operational time in a condition/parameter space where equipment wear may be accelerated, above "normal" wear. However, without predictive and/or historical information on where those respective wear regions exist vis-à-vis the condition/parameter space imposed by the well construction and/or well operation plan (such as 555), a wellsite engineer (or wellsite operator 195) may just be guessing and may be inadvertently allowing risk aversion to push operational conditions/parameters well below where the equipment could be safely operated, or the wellsite engineer (operator 195) may be inadvertently allowing lack of established correlation with catastrophic failure conditions to result in imposition of operational conditions/parameters that are too harsh for the equipment. By utilizing the methods, systems, apparatus, and products of the present disclosure, wellsite engineers can construct well construction and/or well operation plans (such as 555) that balance safety, cost, profit, and efficiency of the entire resource production.

While methods (500) and/or (550) can be utilized for a complete rig (e.g., when enough sensors such as PHM sensors are available on all rig pieces of equipment), it is also disclosed herein to be scalable to systems/sub-systems (such as the fluid circulation system 212) or individual pieces of equipment (such as the fluid/mud pump 144). In the case of a fluid/mud pump, data coming from the fluid end, the mechanical side, and the pump motors can be correlated with drilling hydraulic data coming from the rig control system and/or a software-generated system. This data can be collected to enable the creation of a digital avatar (such as at implementation (540)), which may facilitate modeling of how the operation and/or maintenance of the fluid/mud pump may be affected by the type and characteristics of mud used, flow rate/flux, pressure, and/or other hydraulic and ambient parameters. The avatar/model can indicate impact on pump consumables (such as liner, valves, pistons, etc.) and therefore the frequency and costs of failures and repairs. Also, the modeling of stress, heat, performance of cooling system, vibration, etc. can enable further prediction of impact on the life of the asset. Therefore, when a drilling engineer plans construction and/or operation at the next well site and decide on operational conditions/parameters for the hydraulic program, for example, setting pressure and flow (e.g., in a planning software system), the proposed plan may be run through the digital avatar to advise on incremental COSD associated with those conditions, parameters, or equipment, as well as to advise on impact to asset life, such as compared to a standard baseline, which may in turn affect wellsite/production costs by taking into consideration such items for expenditure.

In accordance with the present disclosure, the method (550) reflecting implementations (555) through (580) may be accomplished through the use of a computer program product comprising a (first) non-transitory, computer-readable medium including (first) instructions that, when executed by a processor of a processing system, cause the processing system to undertake the method (550). Also in accordance with the present invention, the method (500), when reflecting implementations (505) through (540) may be accomplished through the use of a computer program product comprising a (second) non-transitory, computer-readable medium including (second) instructions that, when executed by a processor of a processing system, cause the processing system to undertake the method (500). These two methods (500) and (550) may thus be accomplished separately using two discrete non-transitory, computer-readable media, which may optionally be subsumed under the single computer program product or may represent two separate computer program products. Alternatively, the method (500) reflecting implementations (505) through (580) may be accomplished through the use of a computer program product comprising a non-transitory, computer-readable medium including instructions that, when executed by a processor of a processing system, cause the processing system to undertake the method (500) reflecting implementations (505) through (580).

Further in accordance with the present disclosure, the method (550) reflecting implementations (555) through (580) may be accomplished via a system comprising the piece of equipment and a (first) processing system including a processor and a memory storing a (first) computer program code that, when executed, causes the processing system to undertake the method (550). Still further in accordance with the present invention, the method (500), when reflecting implementations (505) through (540) may be accomplished via a system comprising the piece of equipment and a (second) processing system including a processor and a memory storing a (second) computer program code that, when executed, causes the processing system to undertake the method (500). These two methods (500) and (550) may thus be accomplished separately using two discrete computer program codes, which may optionally be executed using a single processor and/or memory or may be executed on different processors and using different memory (e.g., on separate computers). Alternatively, the method (500) reflecting implementations (505) through (580) may be accomplished via a system comprising the piece of equipment and a processing system including a processor and a memory storing a computer program code that, when executed, causes the processing system to undertake the method (500) reflecting implementations (505) through (580).

In view of the entirety of the present disclosure, including the figures and the claims, a person having ordinary skill in the art will readily recognize that the present disclosure introduces a computer program product comprising a non-transitory, computer-readable medium comprising instructions that, when executed by a processor of a processing system, cause the processing system to: receive a plurality of sensor measurements each generated by a corresponding sensor of a piece of equipment at a wellsite during operation of the piece of equipment; generate a condition indicator for each sensor based on a corresponding sensor measurement; record each condition indicator over a period of time; determine a condition of the piece of equipment based on at least one of the recorded condition indicators; and develop or refine a digital avatar that comprises a model correlating operation of the piece of equipment over time with a progression of the recorded condition indicators to predict future changes in condition of the piece of equipment.

The instructions, when executed, may cause the processing system to determine the condition of the piece of equipment based on a change in at least one of the recorded condition indicators. The instructions, when executed, may cause the processing system to output information related to maintenance of the piece of equipment when at least one of the recorded condition indicators meets or falls below a predetermined performance threshold.

The development or refinement of the digital avatar comprising the model may comprise generating a cost of service delivery (COSD) for the piece of equipment.

The instructions, when executed, may cause the processing system to determine, based on details of a well construction and/or well operation plan for the wellsite: a cost of production of a resource from the wellsite; a cost of the piece of equipment used for production of the resource from the wellsite; a predicted profit from production of the resource from the wellsite; or a combination thereof.

The instructions, when executed, cause the processing system to predict a future progression of conditions of the piece of equipment at the wellsite over time during operation of a well construction and/or well operation plan, based on: details of the plan; and data reflecting an existing progression of conditions of the piece of equipment during operation.

The instructions, when executed, may cause the processing system to: (A) determine first data, or receive the first data as input, wherein the first data is determined based at least partially on details of a well construction and/or well operation plan for a wellsite, and wherein the first data includes: a cost of production of a resource from the wellsite; a cost of equipment used for production of the resource from the wellsite; a predicted profit from production of the resource from the wellsite; or a combination thereof; (B) predict a future progression of conditions of one or more pieces of equipment at the wellsite over time during operation of the plan based at least partially on: details of the plan; and second data reflecting an existing progression of conditions of a digital avatar representing the one or more pieces of equipment during operation; and (C) propose changes to the plan based on a comparison of the input or determined cost of production, cost of the piece of equipment, and/or predicted profit to a cost of service delivery (COSD) for the piece of equipment to operate at the wellsite. The proposed changes may be to reduce or minimize one or more of the costs of production, equipment, and service delivery at the wellsite. The proposed changes may be to increase or maximize profit from production of the resource. The proposed changes may be to: reduce or minimize one or more of the costs of production, equipment, and service delivery at the wellsite; and increase or maximize profit from production of the resource.

The instructions, when executed, may cause the processing system to perform the comparison. The comparison may include an iterative loop such that the proposal of changes reflects combinatorial impact of the details of the plan on the costs and/or profit.

The prediction may be further based on the first data.

The first data may include: the cost of production of the resource from the wellsite; the cost of equipment used for production of the resource from the wellsite; and the predicted profit from production of the resource from the wellsite. The prediction may be further based on such first data.

The piece of equipment may be a portion of a drilling rig at the wellsite. The portion of the rig apparatus may be at least a portion of one or more of a hoisting system, a fluid circulating system, a rotating system, a power system, and a well control system.

The present disclosure also introduces a computer program product comprising a non-transitory, computer-readable medium comprising instructions that, when executed by a processor of a processing system, cause the processing system to: (A) determine first data, or receive the first data as input, wherein the first data is determined based at least partially on details of a well construction and/or well operation plan for a wellsite, and wherein the first data includes: a cost of production of a resource from the wellsite; a cost of equipment used for production of the resource from the wellsite; a predicted profit from production of the resource from the wellsite; or a combination thereof; and (B) predict a future progression of conditions of one or more pieces of equipment at the wellsite over time during operation of the plan based at least partially on: details of the plan; and second data reflecting an existing progression of conditions of a digital avatar representing the one or more pieces of equipment during operation.

The prediction may be further based on the first data.

The first data may include: the cost of production of the resource from the wellsite; the cost of equipment used for production of the resource from the wellsite; and the predicted profit from production of the resource from the wellsite.

The instructions, when executed, may further cause the processing system to: compare the determined or input cost of production, cost of equipment, and/or predicted profit to a cost of service delivery (COSD) for the one or more pieces of equipment to operate at the wellsite; and propose changes to the plan, based on the comparison, to: reduce or minimize one or more of the costs of production, equipment, and service delivery at the wellsite; and/or increase or maximize profit from production of the resource, based on consideration of costs of production, equipment, and service delivery at the wellsite. The comparison may include an iterative loop such that the proposal of changes reflects combinatorial impact of the details of the plan on the costs and/or profit.

The one or more pieces of equipment may comprise a complete drilling rig apparatus. The one or more pieces of equipment may comprise a portion of a drilling rig apparatus. The portion of the drilling rig apparatus may comprise one or more of a hoisting system, a fluid circulating system, a rotating system, a power system, and a well control system.

The non-transitory, computer-readable medium may be a first non-transitory, computer-readable medium, the instructions may be first instructions, and the computer program product may further comprise a second non-transitory, computer-readable medium comprising second instructions that, when executed by the processor, cause the processing system to: receive a plurality of sensor measurements each generated by a corresponding sensor of a piece of equipment at a wellsite during operation of the piece of equipment; generate a condition indicator for each sensor based on a corresponding sensor measurement; record each condition indicator over a period of time to the digital avatar corresponding to the piece of equipment; and determine a condition of the piece of equipment based on at least one of the condition indicators recorded over time. The digital avatar may correspond to a complete rig apparatus comprising the piece of equipment.

The present disclosure also introduces a method comprising: (A) causing operation of a piece of equipment at a wellsite to: (1) perform a plurality of actions by the piece of equipment; and (2) generate sensor measurements each indicative of a corresponding one of the actions; and (B) causing operation of a processing system to: (1) generate a condition indicator for the piece of equipment based on a corresponding sensor measurement; (2) record instances of the condition indicator over a period of time; (3) determine a condition of the piece of equipment based on at least one of the recorded condition indicators; and (4) develop or refine a digital avatar that comprises a model correlating operation of the piece of equipment over time with a progression of the recorded condition indicators to predict future changes in the condition of the piece of equipment.

The developing or refining of the digital avatar may comprise generating a cost of service delivery (COSD) for the piece of equipment.

The method may further comprise causing operation of the processing system to determine data, or receive the data as input, wherein the data is determined based at least partially on details of a well construction and/or well operation plan for the wellsite, and wherein the data comprises a cost of production of a resource from the wellsite, a cost of the piece of equipment used for production of the resource from the wellsite, a predicted profit from production of the resource from the wellsite, or a combination thereof. The data may be first data and the method may further comprise causing operation of the processing system to predict, based on details of the plan and second data reflecting an existing progression of conditions of the piece of equipment during operation, a future progression of conditions of the piece of equipment at the wellsite over time during operation of the plan. The method may further comprise causing operation of the processing system to: compare the determined or input cost of production, cost of the piece of equipment, and/or predicted profit to a cost of service delivery (COSD) for the piece of equipment to operate at the wellsite; and propose changes to the plan based on the comparison. The proposed changes may be to: reduce or minimize one or more of the costs of production, equipment, and service delivery at the wellsite; and/or increase or maximize profit from production of the resource, based on consideration of costs of production, equipment, and service delivery at the wellsite. The comparison may include an iterative loop such that the proposal of changes reflects combinatorial impact of the details of the plan on the costs and/or profit. The piece of equipment may comprise a portion of a drilling rig apparatus selected from the group consisting of a hoisting system, a fluid circulating system, a rotating system, a power system, a well control system, and a combination thereof.

The present disclosure also introduces a method comprising: calculating based on details of a well construction and/or well operation plan for a wellsite, or receiving as input that is determined based on the plan details, a cost of production of a resource from the wellsite, a cost of equipment used for production of the resource from the wellsite, a predicted profit from production of the resource from the wellsite, or a combination thereof; and predicting, based on the plan details and data reflecting an existing progression of conditions of a digital avatar representing one or more pieces of equipment during operation, a future progression of conditions of the one or more pieces of equipment at the wellsite over time during operation of the plan.

The method may further comprise: comparing the calculated or input cost of production of the resource from the wellsite, the calculated or input cost of equipment used for production of the resource from the wellsite, and/or the calculated or input predicted profit from production of the resource from the wellsite to a cost of service delivery (COSD) for the one or more pieces of equipment to operate at the wellsite; and proposing changes to the plan, based on the comparison, to reduce or minimize one or more of the costs of production, equipment, and service delivery at the wellsite and/or to increase or maximize profit from production of the resource, based on consideration of costs of production, equipment, and service delivery at the wellsite. The comparison may include an iterative loop, such that the proposal of changes reflects combinatorial impact of the plan details on the costs and/or profit.

The method may further comprise: receiving a plurality of sensor measurements each generated by a corresponding sensor of a piece of equipment at a wellsite during operation of the piece of equipment; generating a condition indicator for each sensor based on a corresponding sensor measurement; recording each condition indicator over a period of time to the digital avatar corresponding to the piece of equipment; and determining a condition of the piece of equipment based on at least one of the condition indicators recorded over time. The digital avatar may correspond to a complete rig apparatus comprising the piece of equipment.

The present disclosure also introduces a system comprising: (A) a piece of equipment at a wellsite comprising a plurality of sensors each operable to generate a signal indicative of an operational parameter associated with a corresponding action of the piece of equipment; and (B) a processing system comprising a processor and a memory storing a computer program code that, when executed, causes the processing system to: receive a plurality of signals from the plurality of sensors during operation of the piece of equipment at the wellsite; generate a condition indicator for each action based on a corresponding signal; record each condition indicator over a period of time; determine a condition of the piece of equipment based on at least one of the condition indicators recorded over time; and develop or refine a digital avatar that comprises a model correlating operation of the piece of equipment over time with a progression of the condition indicators recorded over time to predict future changes in condition of the piece of equipment over time.

The development or refinement of the digital avatar comprising the model may further comprise generating a cost of service delivery (COSD) for the piece of equipment.

The computer program code, when executed, may further cause the processing system to: calculate based on details of a well construction and/or well operation plan for the wellsite, or receive as input, a cost of production of a resource from the wellsite, a cost of the piece of equipment used for production of the resource from the wellsite, a predicted profit from production of the resource from the wellsite, or a combination thereof; and predict, based on details of a well construction and/or well operation plan for a wellsite and based on data reflecting a progression of conditions of the piece of equipment during operation, a progression of conditions of the piece of equipment at the wellsite over time during operation of the plan. The computer program code, when executed, may further cause the processing system to: compare the calculated or input cost of production of the resource from the wellsite, the calculated or input cost of the piece of equipment used for production of the resource from the wellsite, and/or the calculated or input predicted profit from production of the resource from the wellsite to a cost of service delivery (COSD) for the piece of equipment to operate at the wellsite; and propose changes to the well construction and/or well operation plan, based on the comparison, to reduce or minimize one or more of the costs of production, equipment, and service delivery at the wellsite and/or to increase or maximize profit from production of the resource, based on consideration of costs of production, equipment, and service delivery at the wellsite. The comparison may include an iterative loop, such that the proposal of changes reflects combinatorial impact of the details of the well construction and/or well operations plan on the costs and/or profit. The piece of equipment may comprise a portion of a rig apparatus selected from the group consisting of a hoisting system, a fluid circulating system, a rotating system, a power system, a well control system, and a combination thereof.

The present disclosure also introduces a system comprising: (A) a piece of equipment at a wellsite comprising a plurality of sensors each operable to generate a signal indicative of an operational parameter associated with a corresponding action of the piece of equipment; and (B) a processing system comprising a processor and a memory storing a computer program code that, when executed, causes the processing system to: calculate based on details of a well construction and/or well operation plan for the wellsite, or receive as input, a cost of production of a resource from the wellsite, a cost of equipment used for production of the resource from the wellsite, a predicted profit from production of the resource from the wellsite, or a combination thereof; and predict, based on details of a well construction and/or well operation plan for a wellsite and based on data reflecting a progression of conditions of a digital avatar representing the piece of equipment during operation, a progression of conditions of the piece of equipment at the wellsite over time during operation of the plan.

The computer program code, when executed, may further cause the processing system to: compare the calculated or input cost of production of the resource from the wellsite, the calculated or input cost of equipment used for production of the resource from the wellsite, and/or the calculated or input predicted profit from production of the resource from the wellsite to a cost of service delivery (COSD) for the one or more pieces of equipment to operate at the wellsite; and propose changes to the well construction and/or well operation plan, based on the comparison, to reduce or minimize one or more of the costs of production, equipment, and service delivery at the wellsite and/or to increase or maximize profit from production of the resource, based on consideration of costs of production, equipment, and service delivery at the wellsite. The comparison may include an iterative loop, such that the proposal of changes reflects combinatorial impact of the details of the well construction and/or well operations plan on the costs and/or profit.

The computer program code may be a first computer program code, and the system may further comprise a second computer program code that, when executed, causes the processing system to: receive a plurality of sensor measurements each generated by a corresponding sensor of a piece of equipment at a wellsite during operation of the piece of equipment; generate a condition indicator for each sensor based on a corresponding sensor measurement; record each condition indicator over a period of time to the digital avatar corresponding to the piece of equipment; and determine a condition of the piece of equipment based on at least one of the condition indicators recorded over time. The digital avatar may correspond to a complete rig apparatus comprising the piece of equipment.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A computer program product comprising:
a non-transitory, computer-readable medium comprising instructions that, when executed by a processor of a processing system, cause the processing system to:
receive a plurality of sensor measurements each generated by a corresponding sensor of a piece of equipment at a wellsite during operation of the piece of equipment, wherein the sensor measurements comprise a motor current, an oil temperature, a particle content in a lubrication system, and a bearing temperature;
generate a condition indicator for each sensor based on a corresponding sensor measurement, wherein each condition indicator is indicative of performance of a corresponding action of the piece of equipment;
record each condition indicator over a period of time;
determine a condition of the piece of equipment based on at least one of the recorded condition indicators;
develop or refine a digital avatar representative of at least the piece of equipment, wherein the digital avatar comprises a model correlating operation of the piece of equipment over time with a progression of the recorded condition indicators to predict future changes in the determined condition of the piece of equipment based at least partially on a plan comprising a well construction plan and/or a well operation plan that specifies future actions for the piece of equipment for modification of the plan to operate the piece of equipment at one or more determined capacities of the piece of equipment, wherein the future changes in the determined condition comprise a catastrophic failure to the piece of equipment, wherein the future actions comprise maintenance operations, wherein the model correlates a likelihood of catastrophic failure, a frequency of maintenance operations, and an operational capacity of the piece of equipment, and wherein the operational capacity of the piece of equipment correlates with a loading of the piece of equipment;

determine, based on details of the well construction plan and/or the well operation plan for the wellsite, production down-time due to equipment failure, wherein the production down-time infers:

a cost of production of a resource from the wellsite;

a cost of the piece of equipment used for production of the resource from the wellsite; and a predicted profit from the production of the resource from the wellsite; and modify well operations at the wellsite, in real-time, one or more operation parameters associated with the piece of equipment comprising at least one of weight on bit, rotary speed, drilling torque, tripping speed, well trajectory, mud composition, mud hydraulics, or any combination thereof, wherein the real-time modification at the wellsite increases the operational capacity of the piece of equipment based on the plurality of sensor measurements, the digital avatar representative of at least the piece of equipment, the model that predicts the future changes, and the plan that specifies the future actions.

2. The computer program product of claim 1 wherein the instructions, when executed, cause the processing system to determine the condition of the piece of equipment based on a change in at least one of the recorded condition indicators.

3. The computer program product of claim 2 wherein the instructions, when executed, cause the processing system to output information related to maintenance of the piece of equipment when at least one of the recorded condition indicators meets or falls below a predetermined performance threshold.

4. The computer program product of claim 1, wherein the instructions, when executed, cause the processing system to predict a future progression of conditions of the piece of equipment at the wellsite over time during operation of the well construction and/or well operation plan, based on:

details of the plan; and data reflecting an existing progression of conditions of the piece of equipment during operation.

5. The computer program product of claim 1, wherein the instructions, when executed, cause the processing system to:

determine first data, or receive the first data as input, wherein the first data is determined based at least partially on details of the well construction and/or well operation plan for the wellsite, and wherein the first data includes:

the cost of the production of the resource from the wellsite;

the cost of the piece of equipment used for the production of the resource from the wellsite;

the predicted profit from the production of the resource from the wellsite; or a combination thereof;

predict a future progression of conditions of one or more pieces of equipment at the wellsite over time during operation of the plan based at least partially on: details of the plan; and second data reflecting an existing progression of conditions of the digital avatar representing the at least the piece of equipment during operation; and propose one or more changes to the plan based on a comparison of the input or the determined cost of production, the cost of the piece of equipment, and/or predicted profit to a cost of service delivery (COSD) for the piece of equipment to operate at the wellsite.

6. The computer program product of claim 5 wherein the proposed changes are to reduce or minimize one or more of the costs of production, equipment, or service delivery at the wellsite.

7. The computer program product of claim 5 wherein the proposed changes are to reduce production down-time due to failure of the equipment used for the production of the resource from the wellsite.

8. The computer program product of claim 5 wherein the proposed changes are to reduce production down-time due to failure of the equipment used for the production of the resource from the wellsite, wherein a reduction in production down-time acts to one or more of:

reduce or minimize one or more of the costs of production, equipment, and service delivery at the wellsite; or increase or maximize profit from the production of the resource.

9. The computer program product of claim 5 wherein the instructions, when executed, cause the processing system to perform the comparison.

10. The computer program product of claim 9 wherein the comparison includes an iterative loop such that the proposal of changes reflects combinatorial impact of the details of the plan on the costs and/or the profit.

11. The computer program product of claim 5 wherein the prediction is further based on the first data.

12. The computer program product of claim 5 wherein the prediction is further based on the first data.

13. The computer program product of claim 5, wherein the piece of equipment is a portion of a drilling rig at the wellsite, and wherein the portion of the drilling rig is at least a portion of one or more of a hoisting system, a fluid circulating system, a rotating system, a power system, or a well control system.

14. A method comprising:

causing operation of a piece of equipment at a wellsite to:

perform a plurality of actions by the piece of equipment; and generate sensor measurements each indicative of a corresponding one of the actions, wherein the sensor measurements comprise a motor current, an oil temperature, a particle content in a lubrication system, and a bearing temperature; and causing operation of a processing system to:

generate a condition indicator for the piece of equipment based on a corresponding sensor measurement, wherein the condition indicator is indicative of performance of a corresponding action of the piece of equipment;

record instances of the condition indicator over a period of time;

determine a condition of the piece of equipment based on at least one of the recorded condition indicators; and develop or refine a digital avatar representative of at least the piece of equipment, wherein the digital avatar comprises a model correlating operation of the piece of equipment over time with a progression of the recorded condition indicators to predict future changes in the determined condition of the piece of equipment based at least partially on a plan comprising a well construction plan and/or a well operation plan that specifies future actions for the piece of equipment for modification of the plan to operate the piece of equipment at one or more determined capacities of the piece of equipment, wherein the future changes in the determined condition comprise a catastrophic failure to the piece of equipment, wherein the future actions comprise maintenance operations, wherein the model correlates a likelihood of catastrophic failure, a frequency of maintenance operations, and an operational capacity of the piece of equipment, and wherein the operational capacity of the piece of equipment correlates with a loading of the piece of equipment;

determine, based on details of the well construction plan and/or the well operation plan for the wellsite, production down-time due to equipment failure, wherein the production down-time infers:

a cost of production of a resource from the wellsite;

a cost of the piece of equipment used for production of the resource from the wellsite; and a predicted profit from the production of the resource from the wellsite; and modify well operations at the wellsite, in real-time, one or more operation parameters associated with the piece of equipment comprising at least one of weight on bit, rotary speed, drilling torque, tripping speed, well trajectory, mud composition, mud hydraulics, or any combination thereof, wherein the real-time modification at the wellsite increases the operational capacity of the piece of equipment based on the sensor measurements, the digital avatar representative of at least the piece of equipment, the model that predicts the future changes, and the plan that specifies the future actions.

15. The method of claim 14, further comprising causing operation of the processing system to:

determine first data, or receive the first data as input, wherein the first data is determined based at least partially on details of the well construction and/or well operation plan for the wellsite, and wherein the first data comprises the cost of the production of the resource from the wellsite, the cost of the piece of equipment used for the production of the resource from the wellsite, the predicted profit from the production of the resource from the wellsite, or a combination thereof; and predict, based on details of the plan and second data reflecting an existing progression of conditions of the piece of equipment during operation, a future progression of conditions of the piece of equipment at the wellsite over time during operation of the plan.

16. The method of claim 15 further comprising causing operation of the processing system to:

compare the determined or input cost of production, the cost of the piece of equipment, and/or predicted profit to a cost of service delivery (COSD) for the piece of equipment to operate at the wellsite; and propose changes to the plan based on the comparison, wherein the proposed changes are to: reduce or minimize one or more of the costs of production, equipment, and service delivery at the wellsite; and/or increase or maximize profit from the production of the resource, based on consideration of costs of production, equipment, and service delivery at the wellsite.

17. The method of claim 14, comprising predicting future changes in the condition of the piece of equipment using the digital avatar and operating at least the piece of equipment with reduced likelihood of failure based on the predicting future changes.

18. The computer program product of claim 1, wherein the model comprises a plurality of curves, wherein each curve of the plurality of curves is configured to:

relate a maintenance cost with an amount of failures; and represent a production operation at a percentage of a maximum operational capacity for the piece of equipment.

* * * * *